United States Patent [19]

Polivka et al.

[11] Patent Number: 5,463,656
[45] Date of Patent: Oct. 31, 1995

[54] SYSTEM FOR CONDUCTING VIDEO COMMUNICATIONS OVER SATELLITE COMMUNICATION LINK WITH AIRCRAFT HAVING PHYSICALLY COMPACT, EFFECTIVELY CONFORMAL, PHASED ARRAY ANTENNA

[75] Inventors: Alan L. Polivka, Palm Bay; Charles Zahm, Indialantic, both of Fla.

[73] Assignee: Harris Corporation, Melbourne, Fla.

[21] Appl. No.: 146,289

[22] Filed: Oct. 29, 1993

[51] Int. Cl.$^6$ .............................. H04N 7/167; H04B 1/69
[52] U.S. Cl. .............................. 375/200; 370/18; 380/10; 380/13; 380/19; 380/20
[58] Field of Search .................................. 375/1; 370/18; 380/10, 13, 19, 20

[56] References Cited

U.S. PATENT DOCUMENTS

| | | | |
|---|---|---|---|
| 4,743,906 | 5/1988 | Fullerton | 375/1 |
| 4,901,307 | 2/1990 | Gilhousen et al. | 375/1 |
| 5,127,021 | 6/1992 | Schreiber | 375/1 |
| 5,230,076 | 7/1993 | Wilkinson | 375/1 |
| 5,285,470 | 2/1994 | Schreiber et al. | 375/1 |
| 5,313,457 | 5/1994 | Hostetter et al. | 375/1 |

Primary Examiner—David C. Cain
Attorney, Agent, or Firm—Charles Wands

[57] ABSTRACT

A system architecture and communication methodology for significantly reducing the size of an aircraft antenna required to provide full broadcast quality video communications with an aircraft via a satellite communications link includes a combination of video bandwidth compression, spread spectrum waveform processing and an electronically steered, circular aperture phased array antenna, that is conformal with an airframe surface of the aircraft. The combination provides sufficient signal power to the aircraft, enables interference from other satellites to be rejected and maintains the power spectral density of the satellite's video transmission within FCC requirements. The polarization of the receive array is aligned with that of the incoming beam from the relay satellite by means of an error signal feed back path to control the steering weights of the array. Because the phased arrays are conformal, it is necessary to modify the phase shift settings produced by the antenna steering mechanism executed by the degree of departure of the conformal geometry of the array from a planar configuration. A coordinate transformation look-up table is coupled in the control feedback path from the antenna steering mechanism and the phase shift elements of the phased array.

29 Claims, 7 Drawing Sheets

SYSTEM FOR CONDUCTING VIDEO COMMUNICATIONS OVER SATELLITE COMMUNICATION LINK WITH AIRCRAFT HAVING PHYSICALLY COMPACT, EFFECTIVELY CONFORMAL, PHASED ARRAY ANTENNA

FIELD OF THE INVENTION

The present invention relates in general to communication systems and is particularly directed to system architecture and communication methodology that significantly reduces the size of the aircraft antenna required to provide full broadcast quality video to (or from) an aircraft via a satellite communications link.

BACKGROUND OF THE INVENTION

Conventional schemes for conducting video communications by way of a satellite link use analog modulation formats, which require a very large information bandwidth in order to achieve the full motion and resolution that is characteristic of 'broadcast quality' video. Due to international restrictions and FCC regulations placed upon satellite transmission power spectral density, it is necessary to use a physically large receive antenna with these traditional wideband analog modulation formats, in order to achieve the high signal-to-noise ratio associated with broadcast quality video.

Another factor that mandates the use of a physically large video receive antenna is the need to reject (interfering) transmissions from other satellites which are near the satellite sourcing the video. Because commercial satellites can be spaced as closely as 2° (in longitude) from one another, the antennas utilized in the receive link from these satellites are typically designed to have a null-to-null beamwidth of less than 4° (+/−2°). Such a narrow beamwidth requires a considerably large antenna aperture at the allocated commercial satellite operating frequencies.

Unfortunately, the need to install a large geometry antenna on the aircraft is one of the greatest obstacles incurred to date in attempting to receive broadcast quality video from satellites. This has generally rendered the antenna, and therefore the communication system, to be impractical, because of size, cost, power and/or weight constraints associated with the aircraft. Indeed, the use of a purely mechanically steered aircraft antenna for this application is generally precluded, since most aircraft have limited space on board and the fact that a mechanically steered antenna requires a volume larger than that of the antenna itself, in order to accommodate steering over the range of pointing angles required to maintain communications during normal aircraft flight maneuvers.

To significantly reduce the volume required and to allow placement of the antenna on or near the aircraft's skin, an electronically steered (phased array) antenna (or one that is at least partially electronically steered) is preferred. Electronic scanning, however, affects the antenna aperture area required, since the gain of a phased array antenna configuration decreases (the beamwidth widens) as the antenna is electronically scanned off-boresight. For example, at a scan angle of 60°, the gain may drop by approximately 5 dB from what is achievable at boresight. This reduction in gain must generally be compensated by an increase in antenna aperture area (e.g. by a factor of more than three to recoup the five dB loss). Hence, although the phased array antenna occupies a much smaller volume than a mechanically steered antenna, there is still a strong incentive to reduce the required antenna aperture.

SUMMARY OF THE INVENTION

In accordance with the present, the size of the antenna can be significantly reduced, thereby greatly increasing the practicality of conducting satellite-linked broadcast quality video communications with an aircraft, by means of a combination of video bandwidth compression, spread spectrum waveform processing, forward error correction coding and circular aperture phased array antenna technology. By combining the signal processing methodologies with a phased array antenna, there is realized a communication which ensures that sufficient signal power can be received at the aircraft, interference from other satellites can be rejected and the power spectral density of the satellite's video transmission can be kept within FCC requirements while, at the same time, using a significantly smaller aircraft antenna aperture than would otherwise be possible.

In accordance with the communication mechanism employed by the present invention, video signals to be transmitted to the aircraft, which can originate on the ground from any of a number of potential sources, such as a TV-receive only satellite receiver, cable, etc. are initially digitized and compressed. The compression operation reduces the data rate of the digitized video (which, for example, may be on the order of 100 Mb/s) by nearly two orders of magnitude (with present day technology), while maintaining the full motion and resolution associated with broadcast quality video. The video compression reduces the information bandwidth which, in turn, reduces the receive aperture size required to maintain a given bit error rate (assuming all other factors remain the same). The compressed information bandwidth also improves spread spectrum processing gain.

The digitized compressed video signal can be encoded for forward error correction and then spread spectrum-modulated onto a carrier. The use of error correction coding in conjunction with efficient (e.g. coherent PSK-type or MSK) data modulation further reduces the aperture size for a given bit error rate.

The power spectral density of the modulated signal is reduced via the spread spectrum processing. Spread spectrum processing provides several benefits: reduced power spectral density (for FCC compliance), privacy (to prevent unauthorized users from demodulating the video signal) and it enables the receiver on the aircraft to reject interfering transmissions from other satellites. Spread spectrum processing can take the form of direct PN sequence modulation and/or frequency hopping, for example.

The spread signal is then transmitted from the ground to a relay satellite. The relay satellite retransmits the spread signal through a transmission zone (e.g. continental U.S. conical coverage) within which the aircraft is travelling. The aircraft receives the satellite's transmission via a compact phased array antenna which is preferably conformally configured so that it may be mounted on the fuselage of the aircraft. The phased array antenna provides the required amount of antenna gain, while occupying less volume than would a purely mechanically steered antenna. The phased array antenna may be totally electronically scanned or it may only be partially electronically scanned. An example of a phased array which is only partially electronically scanned is one which scans electronically in one dimension (e.g. elevation) and mechanically (e.g. rotational) in the other. The face (aperture) of such an antenna may be parallel to the plane of rotation or may be tilted. This architecture still provides significant volume reduction as compared with a purely mechanically scanned antenna.

In a preferred embodiment where the antenna can be mounted conformal with the aircraft surface, the antenna is mounted on the top of the fuselage as two phased arrays, one on the port side and one on the starboard side of the aircraft, so as to provide maximal spatial coverage with the satellite regardless of the attitude of the aircraft. A single antenna could be used in place of the port-starboard pair in situations where a more restricted beam scanning volume is acceptable. Conformal mounting provides additional benefits, such as minimal visibility of the antenna, no consumption of cabin space, minimal aerodynamic drag, etc. The antenna aperture is approximately circular so as to reduce the antenna sidelobe levels. This minimizes interference with respect to satellites that are neighbors to the satellite being used.

A monopulse comparator difference channel is employed to control antenna aiming so as to keep the phased array pointed at the satellite regardless of the attitude of the aircraft. The output of the antenna is despread, demodulated, (optionally) decoded and decompressed for use on board the aircraft.

Where the aircraft has an on board video source, such as a video teleconference system, the same basic communication techniques employed for ground-to-air video transmissions are employed for the transmission of video from the aircraft. Compression of the video on the aircraft reduces the required e.i.r.p. from the aircraft and increases attainable spread spectrum processing gain. Spectrum spreading reduces the spectral density of the transmitted signal, which reduces the transmit antenna's aperture size required to allow the transmitted signal to remain within FCC requirements, so as not to interfere with other satellites.

In addition to maintaining the phased array antenna on board the aircraft pointed at the satellite, it is necessary to maintain the polarization of the receive and transmit arrays aligned with those of the relay satellite. For this purpose the output of each antenna element preferably drives a polarizing network containing respective vertical and horizontal polarization associated 90° hybrids and two phase shifters. The phase shift elements are operative to rotate the polarizations of the input waveforms output by the antenna elements, so that any linear polarization can be obtained at the hybrid outputs. Corresponding ports of each 90° hybrid are summed together. The resulting amplitude and phase of the summation output is proportional to the sine and cosine of the angular error between the phase shifter settings and the angular offset of the phased arrays relative to the polarization. Other acceptable means of varying the antenna polarization include mechanically adjustable polarizers (which are especially applicable for the hybrid electro-mechanical array mentioned previously). The summation outputs are demodulated in respective 'polarization channel' and 'data channel' receivers. The 'data channel' receiver is used to phase lock the 'polarization channel' receiver. Functionally, the outputs of the respective receivers are then multiplied together in a mixer to derive an error signal which is a function of the sine of twice the angular polarization error. (In accordance with a preferred implementation, multiplication is achieved digitally, after matched filtering in both receivers.) This output of the "mixer" is coupled through a lowpass loop filter to reduce the noise and to provide a zero steady state tracking error. The lowpass filtered signal is used to adjust the settings of the phase shift elements of the phased arrays, in accordance with a phased array weight control mechanism (for steering the beam pattern of the phased array) contained within the antenna control processor. The transmit array's polarization angle is slaved to that of the receive array. Because the preferred phased arrays are conformal or non-planar, it is necessary to modify the phase shift settings produced by the antenna steering mechanism executed by the control processor according to the degree of departure of the conformal geometry of the array from a planar configuration. For this purpose, a coordinate transformation look-up table is coupled in the control feedback path from the antenna steering mechanism and the phase shift elements of the phased array.

In addition to video communications, the present invention can accommodate other signal formats, such as data from terminals, digital telephony, etc. Simultaneous compressed video and data can be transmitted via TDM, FDM, CDM or a combination thereof.

DETAILED DESCRIPTION

Figure 1:
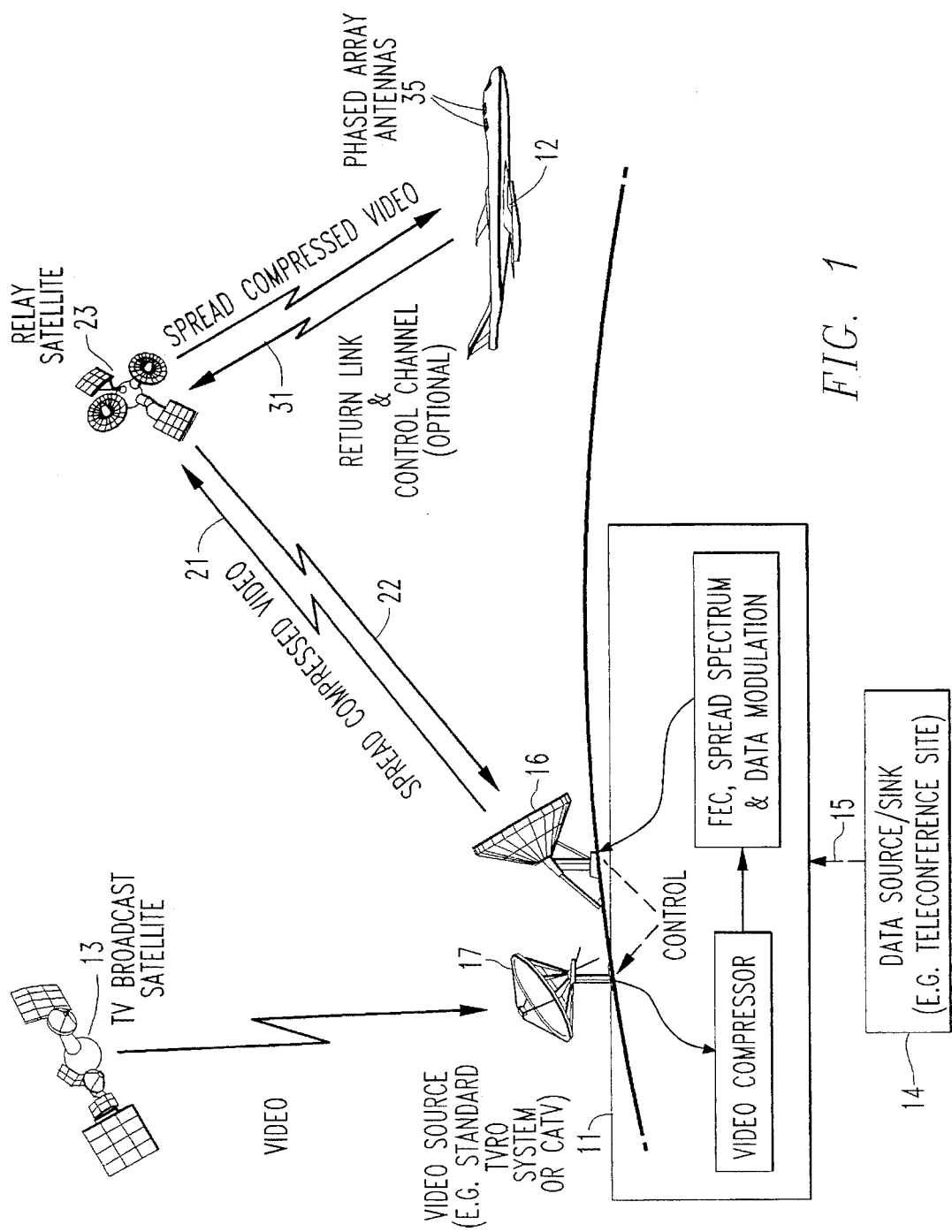
FIG. 1 diagrammatically illustrates a communication system in accordance with an embodiment of the present invention for effecting full motion and resolution broadcast quality video communications between a satellite-linked earth station and an aircraft.

Before describing in detail the satellite-linked video communication system in accordance with the present invention, it should be observed that the present invention resides primarily in what is effectively a novel combination of conventional signal processing and communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

FIG. 1 diagrammatically illustrates a satellite-to-aircraft communication system in accordance with an embodiment of the present invention for effecting full motion and resolution broadcast quality video communications between a satellite-linked earth station 11 and an aircraft 12. Video signals to be transmitted to the aircraft may originate from a variety of sources, such as a TV-receive only satellite receiver, CATV, etc. For purposes of presenting an exemplary embodiment, the video signals will be assumed to include both commercial television programming downlinked from a commercial satellite 13, as well as private teleconference video signals sourced from a teleconferencing site 14, which is linked to earth station 11 by land lines, microwave or fiber-optic links, shown generally at 15.

The video signals received by earth station 11 are processed for transmission to aircraft 12 by way of a transmit/receive antenna dish 16. Antenna 16 uplinks an RF carrier upon which the video has been modulated to a relay satellite 23. The video processing mechanism, to be described more fully below with reference to FIGS. 2A and 2B, involves digitizing the video signals to a prescribed data rate and then compressing the digitized video to a prescribed data rate (e.g. a T1 data rate of 1.544 Mb/s). The compressed digitized video signal can be subjected to (optional) forward error correction encoding and spread spectrum-modulated onto a carrier for transmission to relay satellite 23. Spread spectrum-modulation of the signal reduces its power spectral density. The spread signal is transmitted via uplink channel 21 (e.g. Ku band) to relay satellite 23. Relay satellite 23 then retransmits the spread signal over a downlink transmission channel 31 (e.g. Ku-band) to aircraft 12.

The aircraft 12 receives the satellite's downlink channel retransmission via a compact phased array antenna 35, which may be totally electronically scanned or it may only be partially electronically scanned. As noted above, a phased array which is only partially electronically scanned is one which scans electronically in one dimension (e.g. elevation) and mechanically in the other (e.g. rotational). In a preferred embodiment of the invention, phased array antenna 35 is configured so as to be conformal with the aircraft surface, for example, on the top of the fuselage as two sets of transmit and receive phased arrays, one transmit, receive pair on the port side and the other on the starboard side of the aircraft. Alternatively, transmit and receive functions may be combined into a single array, although generally at the expense of increased aperture size due to additional losses and/or half duplex duty cycle. This port/starboard separation provides approximately full hemispherical coverage with the satellite regardless of the attitude of the aircraft. A single antenna may be used in place of the port-starboard pair in situations where a more restricted beam scanning volume is acceptable. Mounting the antenna on the top of fuselage not only saves cabin space, but, because of its relatively thin, conformal configuration, minimizes antenna visibility and reduces drag. In addition to occupying less volume than would a purely mechanically steered antenna, such a compact phased array antenna 35 provides the required amount of antenna gain.

Uplink transmissions received at the aircraft from relay satellite 23 are processed through a data recovery receiver, which despreads and demodulates the received signal. The demodulated video is then reconstructed for distribution to a variety of terminals and monitors on board the aircraft. Downlink transmissions from the aircraft may include both data and telephony transmissions, including control and overhead signalling, such as that employed for channel selection, and also video signalling in the case that teleconferencing capability is provided.

Figure 2A:
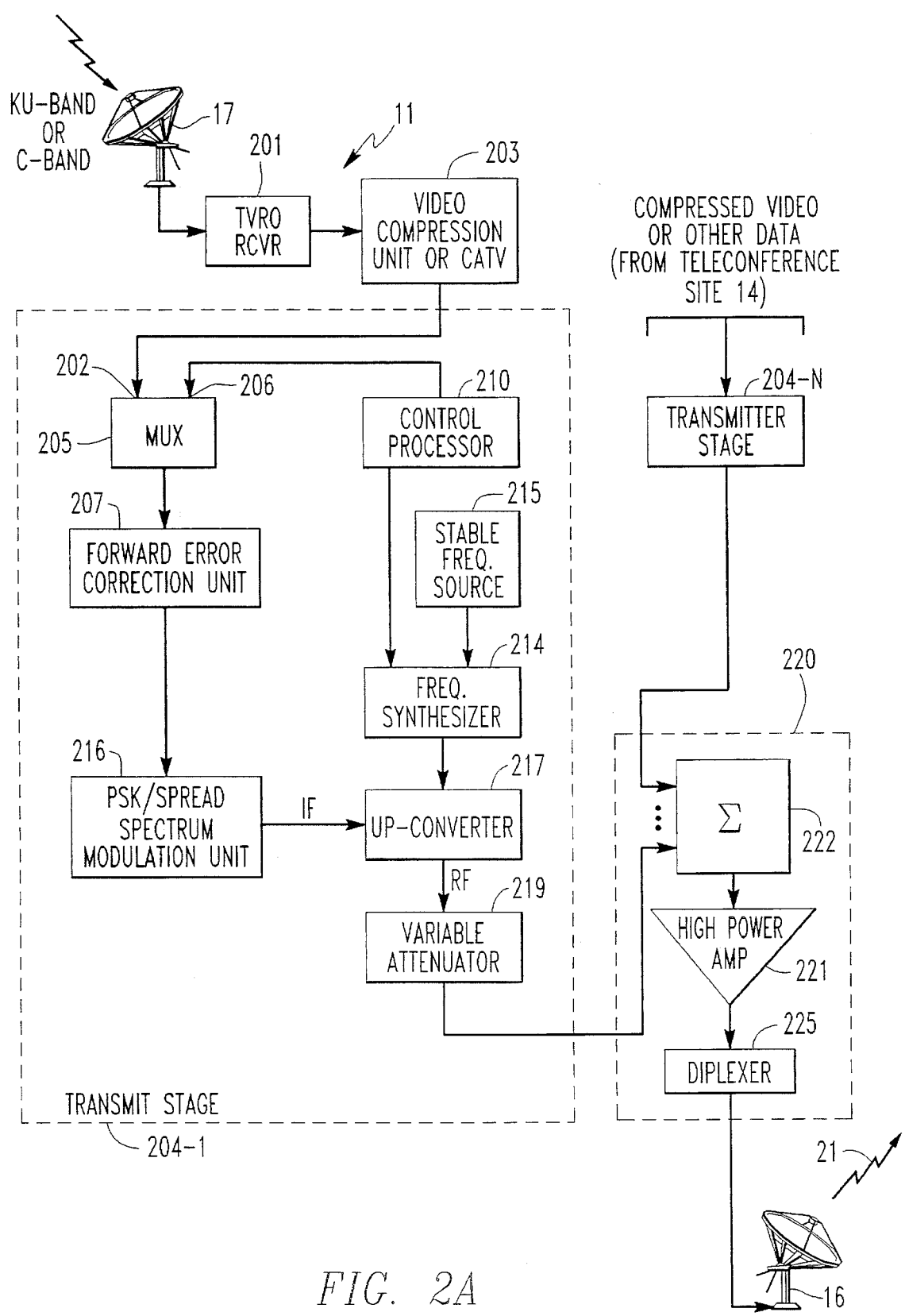
FIGS. 2A and 2B, taken together, diagrammatically illustrate the system architecture of an earth station for sourcing video signals to be transmitted to an aircraft from a commercial satellite providing one or more channels of commercial television programming and teleconference video signals sourced from a teleconferencing site linked to the earth station, the earth station also receiving video etc. signals from the aircraft.
Figure 2B:
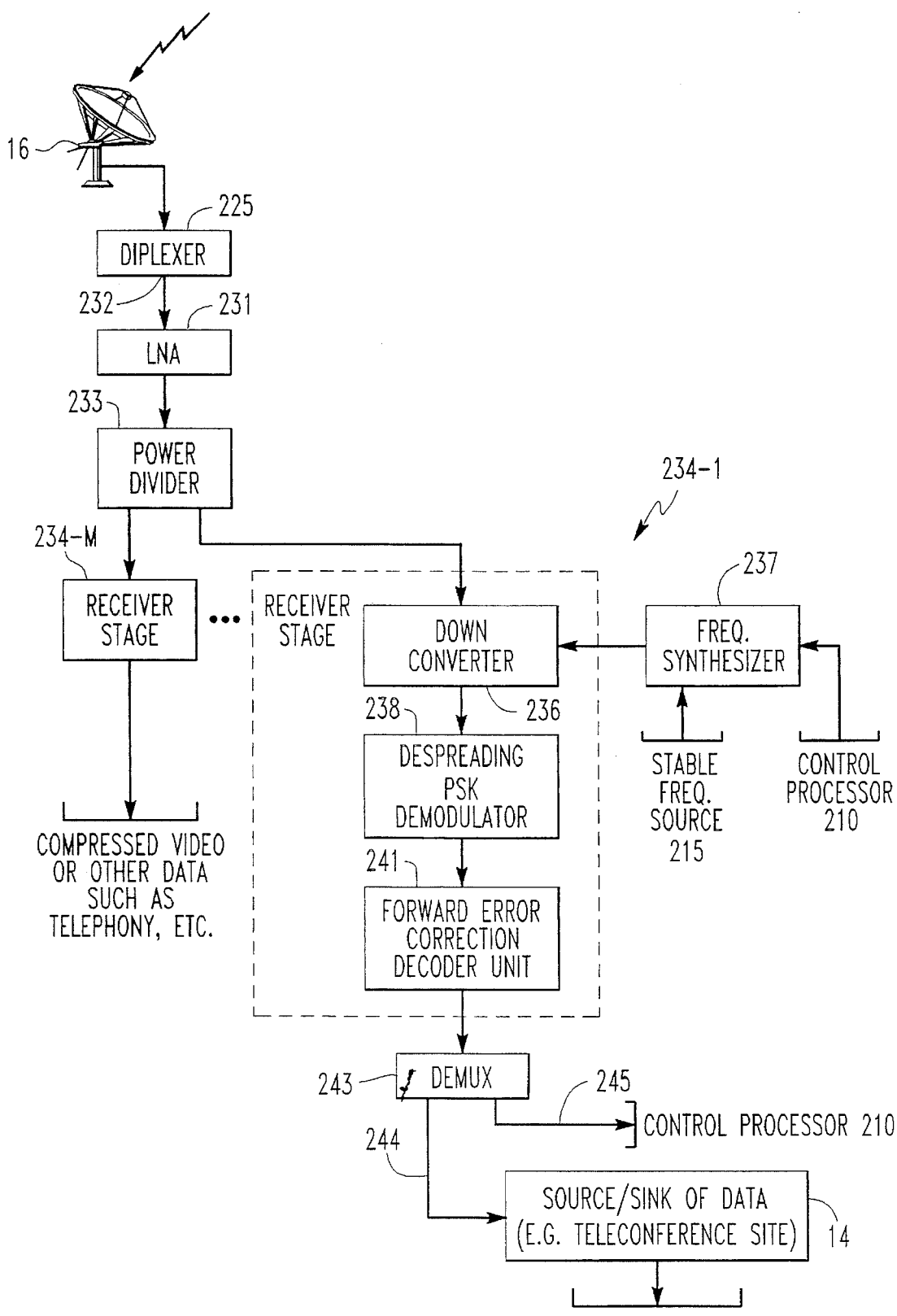

FIGS. 2A and 2B, taken together, diagrammatically illustrate the system architecture of earth station 11 for the present example of sourcing video signals to be transmitted to aircraft 12 from both commercial satellite 13, which provides commercial television programming, as well as private teleconference video signals sourced from teleconferencing site 14 linked to the earth station. In the present example, commercially broadcast television signals are derived via a TV receive-only (e.g. C-band or Ku-band) satellite receiver 201 which is coupled to receiving antenna 17, to which satellite 13 downlinks the analog FM television programming (eventually to be replaced with digital transmission), selected channel(s) of which are forwarded by earth station 11 to aircraft 12. Receiver 201 outputs baseband analog video signals received by antenna 17, which are then processed for transmission via antenna 16 to relay satellite 23.

The processing mechanism employed in accordance with the present invention initially involves digitizing (via an A-D converter, included in video compression unit 203) the television channel(s) supplied by receiver 201 to a prescribed data rate and compressing the digitized television signal(s) by way of video compression unit 203. For this purpose, video compression unit 203 may comprise a Rembrandt II/VP compressor/decompressor unit the CTX Plus™ algorithm, manufactured by CLI (Compression Labs Inc.). Compressing the video reduces (e.g. by nearly two orders of magnitude) its data rate which, for example, may be on the order of 100 Mb/s, while maintaining both full resolution and motion associated with broadcast quality television signals. Since the video compression operation effectively narrows the information bandwidth, it inherently contributes to a reduction in the receive aperture size required to maintain a given bit error rate. The compressed information bandwidth also facilitates spread spectrum processing to be subsequently performed.

The compressed digitized television signal produced by video compression unit 203 is supplied to transmit stage 204-1. Additional transmitter stages 204 may be included which are controllably tunable to respective ones of a plurality of video channels that are available for transmission to the aircraft and are operative to place compressed video (or auxiliary data and telephony) signals onto a carrier for transmission to the relay satellite 23.

For this purpose each modulation stage 204-i has a multiplexer 205, to a first input 202 of which a compressed video channel (or other data) of interest is coupled. As set forth above, the video channel may be derived either from the downlinked channels output by TVRO receiver 201, from one or more teleconferencing sites 14 served by earth station 11, or any other desired data source. The output of multiplexer 205 is coupled to (an optional) forward error correction unit 207. Error correction unit 207 may comprise an STEL-2020 Convolutional Encoder Viterbi Decoder manufactured by Standford Telecommunications, Inc.

Using error correction coding in conjunction with efficient (e.g. coherent PSK-type or MSK) data modulation further reduces the aperture size for a given bit error rate. A second input 206 of multiplexer 205 is derived from an earth station control processor 210 through which the operation of earth station 11 is controlled. Control processor 210 may comprise a processor-based transceiver controller, such as an LCP III Local Control Processor manufactured by TelMac., the supervisory functionality is effected by means of a resident communication control program, such as a System 90, manufactured by CCS (Corporate Computer Systems). The second input provides data/overhead signalling capability customarily employed for communication system control functions. The output of forward error correction unit 207 is coupled to a PSK/Spread Spectrum modulator 216, such as an STEL-2173 NCO in conjunction with an STEL-1032 PRN Coder, manufactured by Standford Telecommunications, Inc. (or a CD7000 cellular telephone by Qualcomm), which performs initial carrier modulation of the compressed video along with PN spreading onto an IF carrier.

Spread spectrum modulation reduces the spectral density of the modulated signal. The spread spectrum processing performed by unit 213 can take the form of direct PN sequence modulation and/or frequency hopping, for example. As described previously, spread spectrum processing reduces power spectral density for FCC compliance, prevents unauthorized users from demodulating the video signal and enables the receiver on the aircraft to reject interfering transmissions from other satellites.

The spread IF signal is coupled to an up-converter 217, which up-converts the spread IF by mixing it with the output of frequency synthesizer 214, such as that used in the CV-121 Ku-band SATCOM transmitter manufactured by Comstream Corp., which is referenced to a stable frequency source 215. The synthesizer frequency is selected by control processor 210. The level of the resulting spread RF signal may be (optionally) adjusted by a variable attenuator 219 for application to one port of a summing unit 222, the output of which is supplied to high power amplifier 221. The output of high power amplifier 221 is coupled to input port 223 of a diplexer 225.

Summing unit 222 is coupled to receive the outputs of the respective signal transmitter stages 204-1 ... 204-N. The T1 data rate information channels that are coupled to modulation stages 204, may include teleconference and data channels, as discussed above. The resulting multi-channel summation signal from summing unit 222 is coupled from diplexer 225 to antenna 16, which outputs the multi-channel signal over uplink channel 21 to relay satellite 23. Relay satellite 23 then retransmits the combined channels over a downlink channel 31 to aircraft 12.

The receiver section of earth terminal 11, shown in FIG. 2B, includes a low noise amplifier 231 which is coupled to an output port 232 of diplexer 225. The output of low noise amplifier 231 is coupled to a power divider 233, which has a plurality of outputs coupled to respective inputs of a set of receiver stages 234-1 ... 234-M. Within a respective receiver stage 234, its power divider input is coupled to an RF-IF down-converter 236, followed by a despreading demodulator unit 238. Under the control of a frequency synthesizer 237, such as that used the DBR-401 Ku-band SATCOM receiver manufactured by Comstream Corp., down-converter 236 reduces the carrier frequency of the spread signal to IF. The IF signal is then despread in despreading demodulator 238, such as that used in the Qualcomm CD7000 cellular phone hand set, where the original PSK modulation is also removed to recover information signals (which may include video, such as teleconference signals) sourced aboard the aircraft.

The output of despreading demodulator 238 may be coupled to an optional FEC decoder 24 and then to a demultiplexer 243, which extracts the compressed information (e.g. video) signal on a first output channel 244 and overhead, control and data on a second output channel 245. Output channel 244, which may contain compressed video that has been sourced from the aircraft 12 is coupled to a remote site teleconference system 14. Output channel 245 may contain channel request information from the aircraft that instructs the control processor 210 to effect a change in the selected television broadcast channel, as will be described below with reference to FIGS. 3A–3B.

Figure 3A:
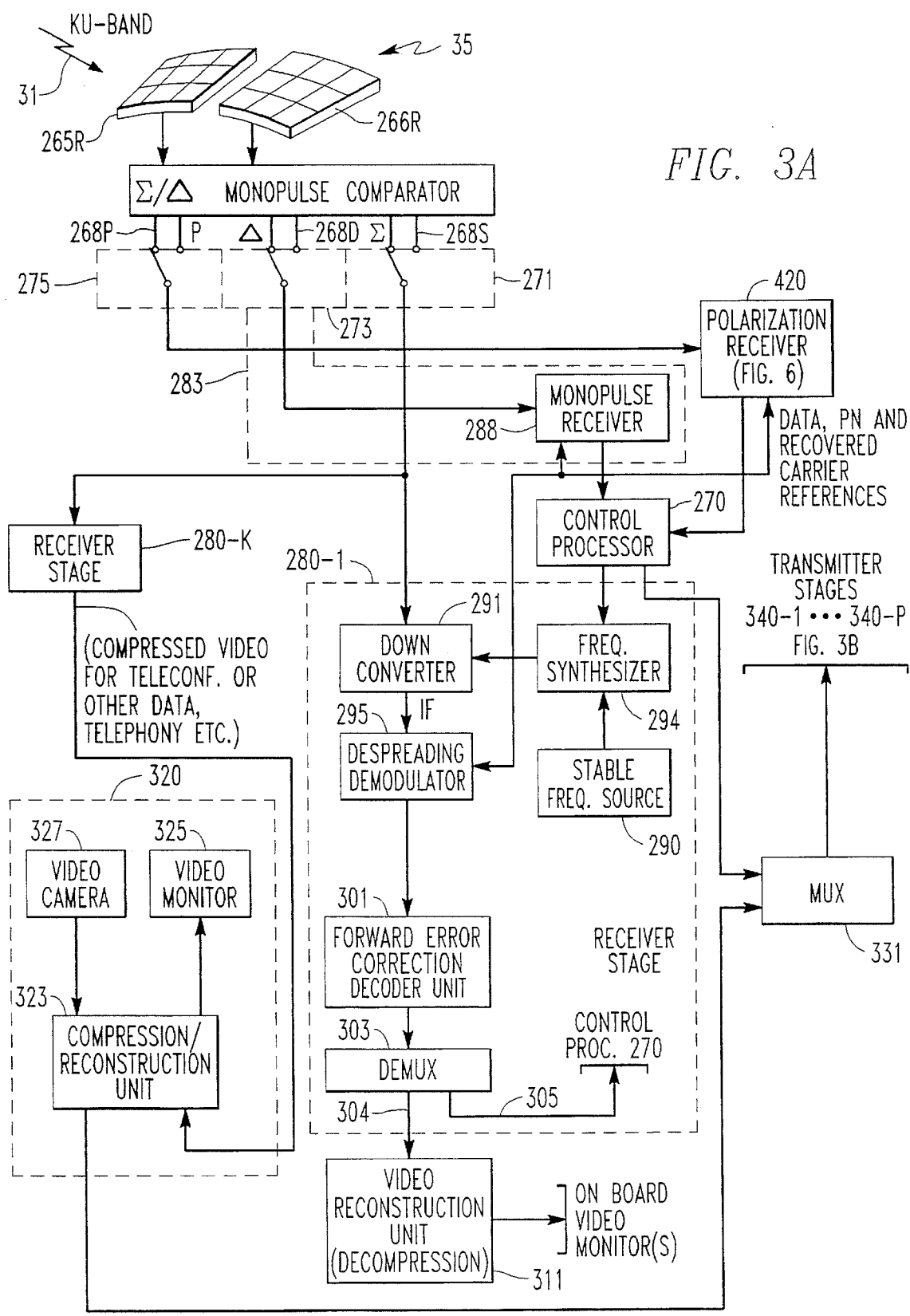
FIGS. 3A and 3B, taken together, show the system architecture of the video transceiver on board an aircraft.
Figure 3B:
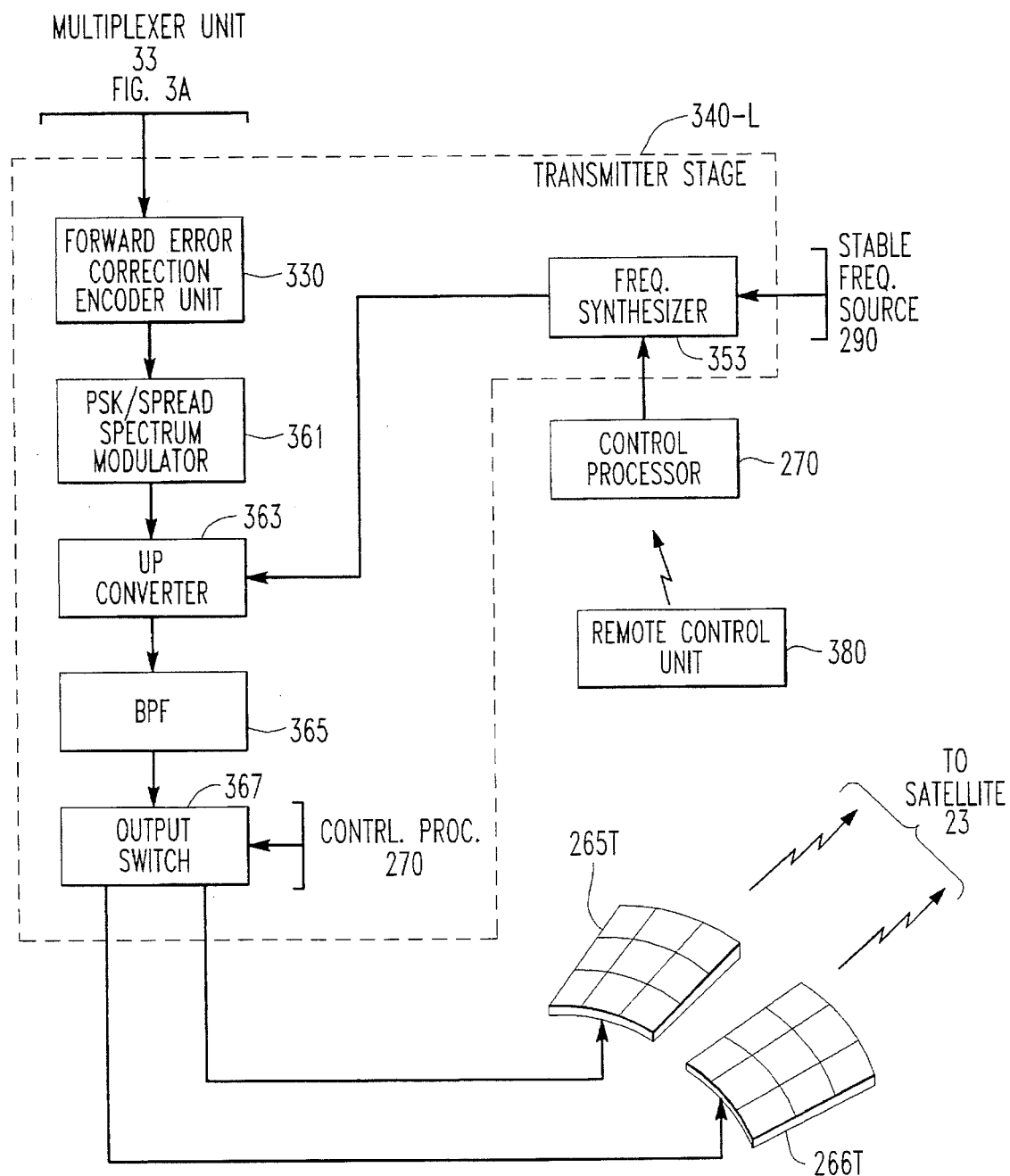
Figure 4:
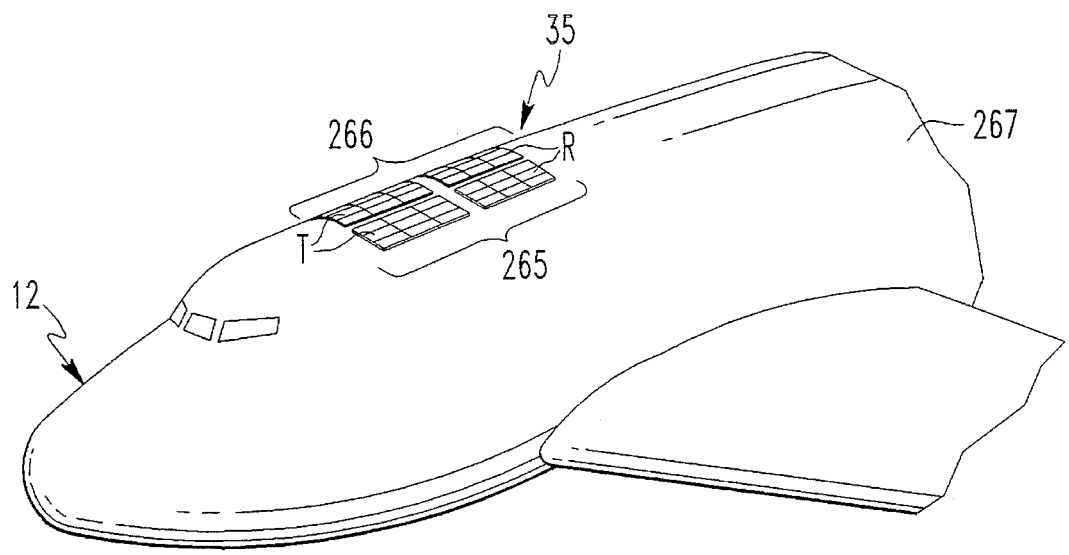
FIG. 4 diagrammatically shows fuselage-mounted conformal phased array antenna comprising two separate pairs of transmit and receive phased arrays, one of which is mounted on the port side of the top of the fuselage of the aircraft and the other of which is mounted on the starboard side of the top of the aircraft fuselage.

Referring now to FIGS. 3A and 3B taken together, the system architecture of the video transceiver aboard the aircraft 12 is shown as comprising a physically compact, phased array antenna 35, which is preferably conformally configured, so that it may be mounted atop the fuselage of the aircraft. In accordance with a preferred embodiment of the invention, phased array antenna 35 comprises two separate pairs of transmit and receive phased arrays. The arrays are shown diagrammatically in FIG. 4 as phased array pairs 265, 266, one of which 265 is mounted on the port side 267 of the top of the fuselage of the aircraft and the other of which 266 is mounted on the starboard side 269 of the top of the aircraft fuselage. This port/starboard separation of the phased array transmit and receive pairs affords approximately full hemispherical coverage between the aircraft and the satellite regardless of the attitude of the aircraft.

As shown in FIG. 3A, the outputs of the port and starboard receiver arrays 265R, 266R of phased array pairs 265, 266 are coupled through a sum and difference monopulse comparator 268 to a set of controllable switches 271, 273, 275, which are controlled by the aircraft system's antenna control processor 270. These controllable switches serve to couple either the port or the starboard phased array pair to a plurality of demodulator stages 280-1 ... 280-K in dependence upon which array is effectively facing the satellite, (as determined by knowledge of the satellite position, navigational inputs (such as INS or GPS) and the aircraft's attitude, using conventional spherical coordinate transformations customarily employed for the purpose, or derived from monopulse tracking). Control processor 270 may comprise a multi-processor based transceiver controller, such as that used in the ARINC 741 Satellite Data Unit (SDU) and Beam Steering Unit (BSU) manufactured by Racal Avionics Ltd. The supervisory functionality is effected by means of a resident communication control program, such as that included in the SDU described above.

Figure 5:
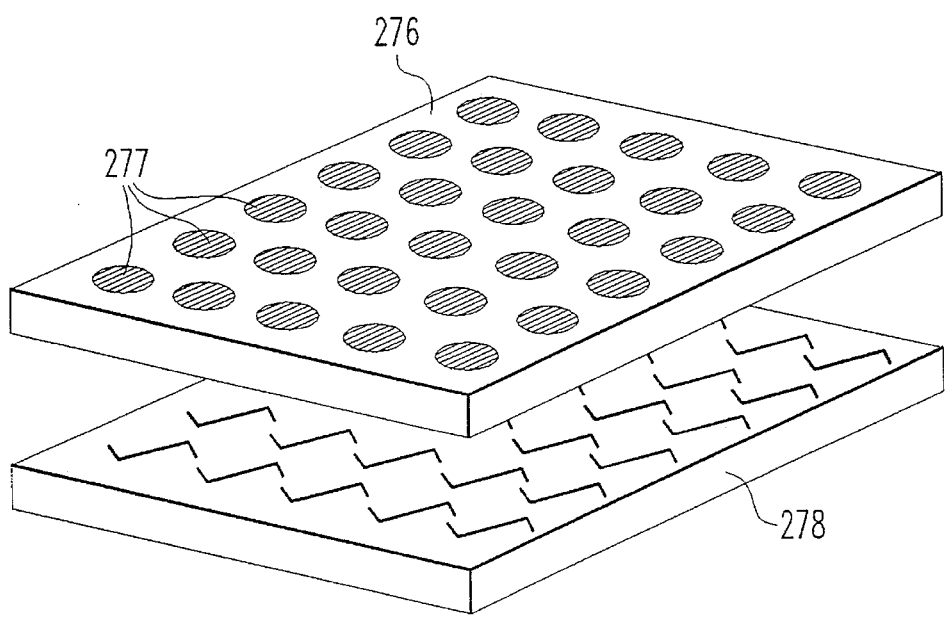
FIG. 5 shows a low profile, conformal configuration of a transmit, receive phased array pair formed of a laminate structure having a top layer that contains a two-dimensional array of antenna elements and a bottom layer through which a transmission line interconnect is distributed.

As shown in FIG. 5, in order to provide a low profile, conformal configuration, each transmit/receive phased array pair preferably comprises a laminate structure having a first, top layer 276 that contains a two-dimensional array of patch antenna elements 277 (although other types of elements, such as waveguide elements, may also be used) and associated electronics (controllable phase shifting weights and gain stages, to be described below with reference to FIG. 6), and a second, bottom layer 278 through which a transmission line interconnect/splitter/combiner network for the antenna elements and their associated controlled weights is distributed. Although other approaches (e.g. stripline) may be used, bottom layer 278 preferably is formed of channeline or waffleline-configured structure, as shown and delineated described for example in U.S. Pat. Nos. 4,641,140 and 4,695,810. As described in these patents, channeline and waffleline transmission line architectures provide a physically compact, especially a relatively 'thin', interconnect structure that enables the overall physical size of both the interconnect structure and the attendant communication circuit components it interconnects to be housed in a very compact configuration, including conformal shapes for use on airborne and spaceborne-mounted platforms. Consequently, phased array antenna 35 provides the required amount of antenna gain and occupies significantly less volume than would a purely mechanically steered antenna.

In accordance with a preferred embodiment, solid state MMIC (monolithic microwave integrated circuit) electronic modules are employed at each element. These modules contain weighting elements built from diode phase shifters. The modules also contain gain stages that operate as distributed low noise amplifiers for the receive arrays and distributed power amplifiers for the transmit arrays. An alternative approach would be to use ferrite phase shifters and possibly fewer amplification elements, due to possible received RF combining (or RF splitting for the transmit case) between the antenna elements and the gain stages. In the preferred embodiment, each antenna array is built from several smaller planar subarrays. This modular approach enables conformal arrays of various aperture areas and curvatures (for various types of aircraft) to be constructed from the same building block subarray modules.

As described previously, within a respective modulator stage 280-i (FIG. 3A), the output of the selected (port or starboard) phased array 265, 266 is coupled through switches 271, 273, 275 to respective ones of subsystems 281, 283, 285, through which the satellite-downlinked signal is applied for respectively deriving video/data information signals, antenna pointing control and polarization control signals. Namely, sum channel, data demodulation subsystem 281 is derived from the antenna's monopulse comparator summation port 268S at the output of switch 271, subsystem 283 is derived from the monopulse comparator difference port 268D at the output of switch 273 (associated with antenna boresight or pointing direction), while polarization tracking subsystem 285 at port 268P is derived from the output of switch 275, used to derive antenna polarization-representative signals, as will be described in detail below with reference to FIG. 6.

The video/data channel path of the aircraft's receiver system is similar to that of earth terminal 11, described above. Specifically, the video/data information channel demodulator stage 280-1 to which the output of summation port switch 271 is connected, includes an RF-IF down-converter 291. Under the control of a frequency synthesizer 294 (referenced to a stable frequency source 290), down-converter 291 reduces the (Ku band) RF carrier of the incoming spread signal to IF band. The IF signal is then despread in despreading demodulator 295, such as that used in the above-mentioned CD7000 from Qualcomm, in order to recover the T1 data rate compressed video and any accompanying data/control signals that were injected in the signal stream by earth station control processor 210 (FIG. 2B). The output of despreading demodulator 295 is coupled to a decoder unit 301, such as an STEL-2020 Convolutional Encoder Viterbi Decoder, manufactured by Standford Telecommunications, Inc., which decodes the forward error correction-encoded combined video/data signal and outputs the decoded signal to a demultiplexer 303.

Demultiplexer 303 extracts the compressed video on a first output channel 304 and overhead/control data on a second output channel 305. First output channel 304 is coupled to a video reconstruction unit 311, such as the previously mentioned Rembrandt II/VP compressor/decompressor unit with the CTX Plus™ algorithm, manufactured by Compression Labs Inc., which decompresses/expands the decoded video signal into its original full resolution digitized format and converts the video signal to analog format for application to one or more video monitors distributed throughout the aircraft for viewing by passengers. The output of video reconstruction unit 311 is coupled to one or more video monitors for viewing. If, instead of video, the system is employed to communicate other types of digital information, output 304 from demultiplexer 303 may be coupled to other output devices, such as digital telephone handsets, data terminals (e.g. personal computers), and facsimile machines, rather than to video reconstruction unit 311.

As pointed out earlier, the aircraft may also employ an on-board video source, such as a video teleconference system 320. In this circumstance, the teleconferencing video signal from on-board teleconferencing system 320 is applied to the modulator/transmitter portion of the aircraft's transceiver system, to be described below with reference to FIG. 3B.

The received T1 rate video teleconference channel (from receiver stage 280-K) is coupled to a teleconferencing video compression and reconstruction unit 323, such as a Rembrandt II/VP compressor/decompressor unit with the CTX Plus™ algorithm, manufactured by Compression Labs Inc. Unit 323 decompresses the T1 teleconferencing video and reconstructs the signal into full resolution analog format for application to a teleconferencing video monitor 325. Teleconferencing video compression and reconstruction unit 323 is also coupled to the output of a video camera 327 within the teleconferencing system 320. Teleconferencing video compression and reconstruction unit 323 digitizes and compresses the output of video camera 327. The compressed digitized teleconference video signal is then applied to multiplexer 331.

The output of multiplexer 331 is coupled to a forward error correction unit 333, such as an STEL-2020 Convolutional Encoder Viterbi Decoder, manufactured by Stanford Telecommunications, Inc. A second input of multiplexer 331 is derived from on-board control processor 270. As in the case of earth station 11, the second input of multiplexer 331 provides control data/overhead signalling capability employed for communication system control and video channel selection signalling. The output of forward error correction unit 333 is a teleconference video/data signal (at a higher than T1 channel rate due to forward error correction coding) for application to one or more modulator stages 340-1 . . . 340-P, shown in FIG. 3B.

As shown in FIG. 3B, a respective modulator stage 340-i includes a PSK/spread spectrum modulator 361, such as an STEL-2173 NCO in conjunction with an STEL-1032 PRN Coder, manufactured by Stanford Telecommunications, Inc., which PSK modulates the combined video/data onto an IF carrier and spreads the signal, being referenced to stable frequency source 290 under the control of control processor 270. As in the case of uplink satellite-to-aircraft communications, the use of error correction coding in conjunction with efficient data modulation, such as coherent PSK or MSK modulation serves to decrease the aperture size of the transmit phased array for a given bit error rate.

The spread spectrum modulation, applied in PSK/spread spectrum modulator 361, reduces the spectral density of the modulated signal. The spread IF signal is coupled to an up-converter 363, which up-converts the spread IF signal to Ku band for transmission, by mixing it with the output of frequency synthesizer 353, such as that used in the CV-121 Ku-band SATCOM transmitter manufactured by Comstream Corp. The RF signal is coupled through a band pass filter 365 tuned to the frequency band of the Ku-band satellite uplink, and the filtered signal is then coupled through an output switch 367 for application to a starboard or port transmit phased array antenna pair 265T, 266T, under the control of control processor 270. Each transmit array includes high power amplifier(s) which may be distributed across the array, or may be coupled between its input switch and the array. The spread signal is then transmitted to relay satellite 23, which retransmits the spread signal over a downlink channel 22 to earth station 11.

As mentioned previously, the auxiliary or overhead data channel that is multiplexed with the video signals provides the system with the ability to generate and respond to video channel selection requests sourced from the aircraft. For this purpose, the on-board system control processor 270 may be coupled with a remote control unit 380, similar to that used with any home television unit, by way of which channel designation signals are generated. These channel request signals are then coupled to the overhead control channel of multiplexer 331 and injected in the overhead channel of a respective modulator 340-i for transmission to earth station 11.

In order to maintain each of the transmit and receive phased array pairs accurately pointed at the relay satellite 23, the difference channel output of the receive array 265R, 266R is down-converted and demodulated by a monopulse demodulator 288 within pointing subsystem 283 and coupled to processor 270. Monopulse demodulator 280 is a duplicate of PSK/spread spectrum demodulator 295. Carrier phase and PN (pseudo noise/spread spectrum) timing for the monopulse demodulator are slaved to that of the despread demodulator. Monopulse pointing error ambiguity (due to the presence of data demodulation) is removed in the monopulse demodulator by decision direction (from the despread demodulator). Control processor 270 also contains a boresight control mechanism, such as a conventional monopulse tracker or open loop pointing similar to that used in an ARINC 741 Satellite Data Unit (SDU) and Beam Sterring Unit (BMU) manufactured by Racal Avionics Ltd., for controlling the weighting coefficients of the respective elements of the transmit and receive arrays and thereby the steering of their radiation patterns toward relay satellite 23.

In addition to boresight control, it is necessary to maintain the polarization of the receive array aligned with that of the incoming beam from the relay satellite. The basic problem is to track the linear polarization of the relay satellite downlink transmission by means of the conformal phased array pair 265, 266 mounted on the airframe. The technique to be described below is very similar to that used in a monopulse tracking system, in which an error signal is developed that contains the magnitude and sign information needed for closed-loop tracking.

Figure 6:
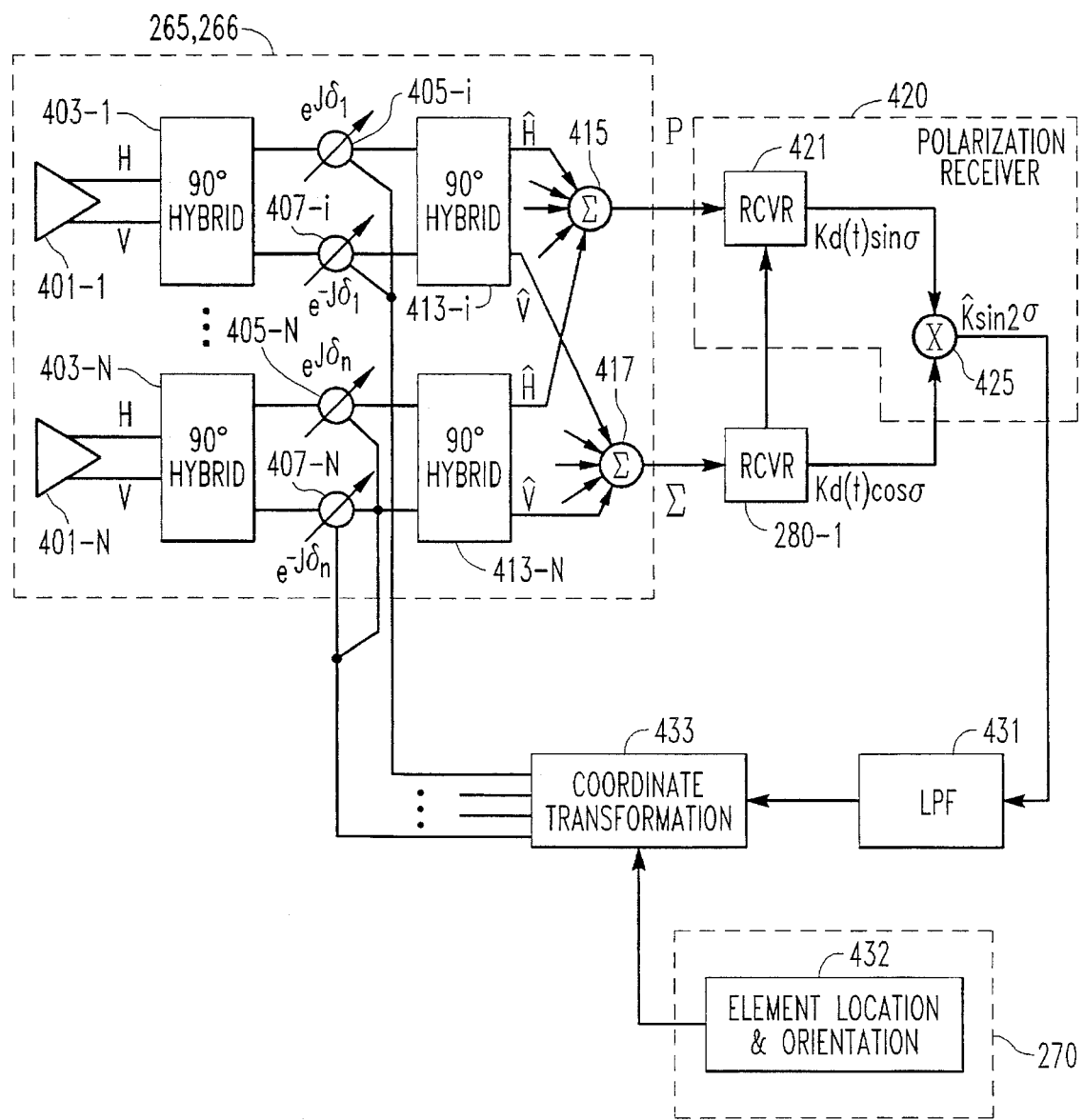
FIG. 6 shows the polarization tracking mechanism associated with the antenna elements of a respective conformal phased array comprised of a two-dimensional distribution of dual polarization antenna elements.

More particularly, FIG. 6 shows the elements of a respective one of conformal phased arrays 265, 266, comprising a two-dimensional distribution of dual polarization antenna elements 401-1 . . . 401-N. The output of each antenna element drives a polarizing network containing two 90° hybrids and two phase shifters. Specifically, each antenna element has horizontal (H) and vertical (V) outputs coupled to 90° hybrids 403-1 . . . 403-N, output ports of which, in turn, are coupled through respective pairs of controllable phase shift elements 405-1, 407-1 . . . 405-N, 407-N to dual input ports of 90° hybrids 413-1 . . . 413-N.

The phase shift elements are operative to rotate the polarizations of the input waveforms output by the antenna elements, so that any linear combination can be obtained at the output of the hybrid. Corresponding ports of each 90° hybrid 413-i are summed together by means of first and second summation units 415 and 417. The resulting amplitude and phase of the output of each of summation units 415 and 417 is thus proportional to the sine and cosine of the angular error between the phase shifter settings and the angular offset of the phased arrays relative to the polarization. The outputs of summation units 415 and 417 are demodulated in respective 'polarization channel' and 'data channel' receivers 421, 280-1 of a polarization receiver 420. The 'data channel' receiver 280-1 is used to phase lock 'polarization channel' receiver 415. The outputs of the respective receivers are multiplied together in a mixer 425 to derive an error signal which is a function of the sine of twice the angular error. This output of mixer 425 is coupled to lowpass filter 431 to reduce the noise, as well as to provide a zero steady state tracking error. The output of lowpass filter 431 is used to adjust the settings of the phase shift elements 405-i and 407-i, defined by a phased array weight control mechanism 432 for steering the beam pattern of the phased array contained within antenna control processor 270, in order to drive the error signal to zero. Because the phased arrays are conformal or non-planar, it is necessary to modify the phase shift settings produced by the antenna steering mechanism 432 executed by control processor 270 by the degree of departure of the conformal geometry of the array from a planar configuration. For this purpose, a coordinate transformation look-up table 433 is coupled in the control path from the antenna steering mechanism 432 and the phase shift elements 407, 407 of the phased array. The look-up table has as inputs aircraft attitude in terms of yaw, pitch and roll angles, as well as each element location and the normal vector of each element and the element's orientation. The function of the look-up table is to assure that the polarization of each element, as seen by the receiver, is identical and to rotate the far field polarization so as to drive the error to zero. The output of low pass filter 431 is used to modify the phase shifter weights of the conformal array, as defined by coordinate transformation look-up table 433, to drive the error signal to zero, so that the resulting polarization is identical (vertical) from element to element.

The preferred embodiment described above provides closed loop tracking to maintain proper polarization and pointing of the aircraft antenna. An alternative approach would be to simply compute the correct polarization and pointing based upon knowledge of present aircraft position, heading and roll (from on-board navigation equipment such as INS or GPS) and known satellite ephemeris.

As will be appreciated from the foregoing description, by means of a combination of video bandwidth compression, spread spectrum waveform processing and phased array antenna technology, the present invention provides both a system architecture and a communication methodology that significantly reduces the size of aircraft antenna that is required to provide full broadcast quality video communications with an aircraft via a satellite communications link. By combining the signal processing methodologies with a phased array antenna, there is realized a communication which ensures that sufficient signal power can be received at the aircraft, interference from other satellites can be rejected and the power spectral density of the satellite's video transmission can be kept within FCC requirements while, at the same time, using a significantly smaller aircraft antenna aperture than would otherwise be possible.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of conducting video communications between a first site and a second site comprising the steps of:

(a) digitally compressing an input video signal, said video signal containing the entirety of the contents of a video image having no frequency information removed therefrom, to derive a compressed bandwidth video signal;

(b) modulating a carrier signal, to be transmitted from said first site to said second site, with said compressed bandwidth video signal;

(c) spreading the spectral density of the modulated carrier signal obtained in step (b) and thereby causing the spectral density of the entirety of the image information contents of said video image, as contained in said compressed bandwidth video signal to be spread and transmitting the resulting spread signal to said second site; and (d) at said second site, receiving the spread signal transmitted in step (c) by way of a phased array antenna.

2. A method according to claim 1, wherein step (d) comprises receiving the spread signal transmitted in step (c) by way of an electronically steered, circular aperture phased array antenna.

3. A method of transmitting video communication signals from a first station by way of a satellite communication link to an airborne receiving stations comprising the steps of:

(a) compressing input video communication signals, said video communication signals containing the entirety of the contents of a video image having no frequency information removed therefrom, to derive compressed video communication signals;

(b) modulating a carrier signal, to be transmitted from said first station to said airborne receiving station, with said compressed video communication signals;

(c) spreading the spectral density of the modulated carrier signal obtained in step (b) and thereby causing the spectral density of the entirety of the image information contents of said video communication signals as contained within said compressed video communication signals to be spread, and transmitting the resulting spread signal to said airborne receiving station by way of said satellite communications link; and (d) at said airborne receiving station, receiving the spread signal transmitted in step (c) by way of a phased array antenna.

4. A method according to claim 3, wherein step (d) comprises receiving the spread signal transmitted in step (c) by way of an electronically steered, circular aperture phased array antenna.

5. A method according to claim 4, wherein step (d) comprises receiving the spread signal transmitted in step (c) by way of a phased array antenna, the physical configuration of which is conformal with an airframe surface of said airborne receiving station.

6. A method according to claim 5, wherein step (d) comprises controlling the operation of said phased array antenna such that its polarization response is effectively aligned with that of the spread signal received thereby.

7. A method according to claim 6, wherein said step (d) of controlling the operation of said phased array antenna such that its polarization response is effectively aligned with that of the spread signal received thereby includes adjusting respective weights of antenna elements of said array in accordance with the geometry of the surface over which the antenna elements of said phased array antenna are distributed.

8. A method of transmitting video communication signals from an airborne transmitting station by way of a satellite communication link to a receiving station comprising the steps of:

(a) compressing input video communication signals, said video communication signals containing the entirety of the contents of a video image having no frequency information removed therefrom, to derive compressed video communication signals;

(b) modulating a carrier signal, to be transmitted from said airborne station to said receiving station, with said compressed video communication signals; and (c) spreading the spectral density of the modulated carrier signal obtained in step (b) and thereby causing the spectral density of the entirety of the image information contents of said video communication signals as contained within said compressed video communication signals to be spread, and transmitting, by way of a phased array antenna, the resulting spread signal from said airborne transmitting station by way of said satellite communications link to said receiving station.

9. A method according to claim 8, wherein the physical configuration of said phased array antenna is conformal with an airframe surface of said airborne station.

10. A communication system for transmitting video communication signals over a satellite communication link from a first station to an airborne receiving station comprising:

at said first station, a video signal compression unit which is operative to compress input video communication signals supplied thereto, said video communication signals containing the entirety of the contents of a video image having no frequency information removed therefrom, and output therefrom compressed video communication signals, and a spread spectrum transmitter which is operative to modulate a carrier signal, to be transmitted from said first station to said airborne receiving station, with compressed video communication signals output from said video compression unit and to spread the spectral density of the modulated carrier signal and thereby causing the spectral density of the entirety of the image information contents of said video communication signals as contained within said compressed video communication signals to be spread, for transmission to said airborne receiving station by way of said satellite communications link; and at said airborne receiving station, an electronically steerable phased array antenna, the output of which is coupled to a spread spectrum receiver.

11. A communication system according to claim 9, wherein said airborne station comprises an aircraft and wherein said electronically steerable phased array antenna is substantially conformal with an external body portion of said aircraft.

12. A communication system according to claim 9, wherein said video communication signals include teleconference communication signals and the aircraft has an onboard video signal compression unit which is operative to compress input video communication signals, supplied thereto from an on-board video camera, output therefrom as compressed video communication signals, and an airborne spread spectrum transmitter which is operative to modulate a carrier signal, to be transmitted from said airborne station, with compressed video communication signals output from said airborne video compression unit and to spread the spectral density of the modulated carrier signal for transmission to said first station by way of said satellite communications link.

13. A communication system according to claim 11, including an antenna controller which is operative to control the operation of said electronically steerable phased array antenna such that its polarization response is effectively aligned with that of the spread signal received thereby.

14. A communication system according to claim 13, wherein said antenna controller is operative to adjust respective weights of antenna elements of said array in accordance with the geometry of a conformal surface over which the antenna elements of said phased array antenna are distributed.

15. A communication system for conducting video communications between a first site and a second site comprising:

at said first site, a video signal compression unit which is operative to compress an input video signal supplied thereto, said video signal containing the entirety of the contents of a video image having no frequency information removed therefrom, and to output a compressed video signal;

an encoding modulator which is operative to modulate said compressed video signal in accordance with a prescribed modulation format and to spread the spectral density of the modulated signal and thereby causing the spectral density of the entirety of the image information contents of said video image, as contained in said compressed bandwidth video signal to be spread;

a transmitter which is operative to transmit the spread modulated signal via a transmission channel to said second site; and at said second site, a receiver which is operative to receive the spread signal, transmitted from said first site, by what of a phased array antenna.

16. A communication system according to claim 15, wherein said receiver is operative to receive the spread signal, transmitted from said first site, by way of an electronically steered, circular aperture phased array antenna.

17. A communication system according to claim 15, wherein said receiver is installed on board an aircraft for reception of said spread signal via a satellite communications link.

18. A communication system according to claim 15, wherein said receiver is installed aboard an aircraft and wherein said phased array antenna is conformal with an airframe surface of said aircraft.

19. A communication system according to claim 18, including an antenna controller which is operative to control the operation of said phased array antenna such that its polarization response is effectively aligned with that of the spread signal received thereby.

20. A communication system according to claim 19, wherein said antenna controller is operative to adjust respective weights of antenna elements of said array in accordance with the geometry of the airframe surface over which the antenna elements of said phased array antenna are distributed.

21. A communication system according to claim 15, wherein said aircraft further includes an airborne video signal compression unit which is operative to compress input video communication signals, supplied thereto from an on-board video camera, output therefrom as compressed video communication signals, and an airborne spread spectrum transmitter which is operative to modulate a carrier signal, to be transmitted from said airborne station, with compressed video communication signals output from said airborne video compression unit and to spread the spectral density of the modulated carrier signal for transmission to said first station.

22. For use with a communication system having a phased array antenna that is conformal with a non-planar surface, a method of controlling the operation of said phased array antenna such that its polarization response is effectively aligned with that of a signal received thereby, comprising adjusting respective weights of antenna elements of said array in accordance with the geometry of the non-linear surface over which the antenna elements of said phased array antenna are distributed.

23. A method according to claim 22, wherein said non-linear surface corresponds to a surface that is conformal with an aircraft surface.

24. A method according to claim 22, wherein outputs of said phased array are coupled to a summation channel receiver and to an auxiliary polarization channel receiver, and wherein outputs of said receivers are combined to derive an error signal which is coupled in a feedback loop to modify a geometry-based weighting mechanism through which the weights of respective ones of said antenna elements are adjusted, whereby said error signal is effectively driven to zero.

25. A method according to claim 1, wherein step (c) comprises transmitting said spread signal over a common antenna beam to said second site, and wherein step (d) comprises receiving the spread signal transmitted in step (c) over said common antenna beam and detecting said spread signal by way of said phased array antenna.

26. A method according to claim 3, wherein step (c) comprises transmitting said spread signal over a common antenna beam to said airborne receiving station, and wherein step (d) comprises receiving the spread signal transmitted over said common antenna beam and deriving said spread signal by way of said phased array antenna.

27. A method according to claim 8, wherein step (c) comprises transmitting said resulting spread signal by way of a common antenna pattern derived from said phased array antenna.

28. A communication system, according to claim 10, wherein said spread spectrum transmitter is operative to transmit a spectral density-spread modulated carrier signal over a common antenna beam to said airborne receiving station, and wherein said electronically steerable phased array antenna at said airborne receiving station is operative to receive said common antenna beam into derived said spectral density-spread modulated carrier signal therefrom for application to said spread spectrum receiver.

29. A communication system according to claim 15, wherein said first site further includes an antenna, coupled to said transmitter and being operative to transmit said spread modulated signal over a common antenna beam to said second site, and wherein said phased array antenna at said second site is operative to receive said common antenna beam transmitted from said first site, and to derive therefrom said spread signal for application to said receiver.

* * * * *